United States Patent
Evans

[15] 3,689,776
[45] Sept. 5, 1972

[54] ISOLATION OF PARALLEL CELL STACKS IN THERMAL BATTERIES BY A SQUIB SWITCH

[72] Inventor: David G. Evans, Hackettstown, N.J.

[73] Assignee: The United States of America as represented by the Secretary of the Army.

[22] Filed: Aug. 25, 1970

[21] Appl. No.: 66,717

[52] U.S. Cl. .....................307/66, 136/162, 320/15, 320/13
[51] Int. Cl. ..............................................H02j 7/00
[58] Field of Search.......136/162 X; 320/15 X, 13 X; 307/66, 64, 149, 150

[56] References Cited

UNITED STATES PATENTS 3,592,697  7/1971  Braun.........................136/162

Primary Examiner—Herman J. Hohauser
Attorney—Harry M. Saragovitz, Edward J. Kelly and Herbert Berl

[57] ABSTRACT

A squib switch is used to reliably isolate and transfer power to an external load in the presence of high nuclear and thermal radiations. The squib switch is used in an electrical circuit to remove the fast activate battery from the external load after a long life, slow activate thermal power battery connected in parallel, comes up to voltage. The electrical circuit provides for cell isolation so that the fast rise time of the fast activate battery can be combined with the long life characteristic of the slow activate battery without having the residual internal impedance of the fast activate battery dissipate energy from the power battery.

2 Claims, 1 Drawing Figure

PATENTED SEP 5 1972 3,689,776
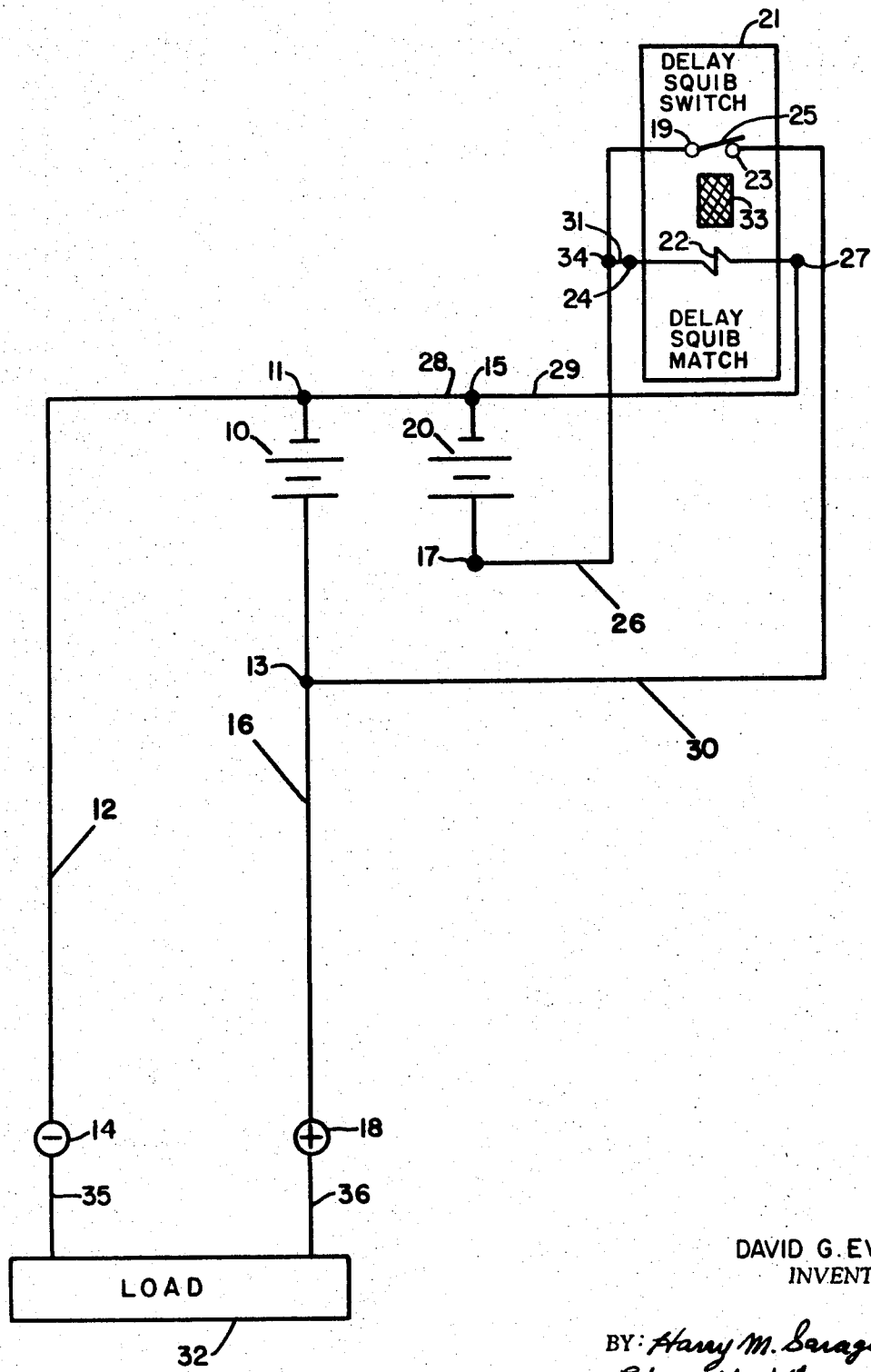
DAVID G. EVANS
INVENTOR.
BY: Harry M. Saragovitz,
Edward J. Kelly &
Herbert Berl  Attorneys.

ISOLATION OF PARALLEL CELL STACKS IN THERMAL BATTERIES BY A SQUIB SWITCH

GOVERNMENT INTEREST

The invention described herein may be manufactured, used, and licensed by or for the Government for governmental purposes without the payment to me of any royalty thereon.

BACKGROUND OF THE INVENTION

The present invention relates to the combination of a delay squib switch and two thermal-activate batteries in an electrical circuit to provide a warhead section with a source of power which has the rapid voltage and current rise time of a fast activate thermal battery and the long life characteristic of a slow-activate thermal battery.

Present fast activate (140–250 millisecond) thermal batteries, which last 2 to 5 seconds, do not have the required cell life necessary to supply the warhead power. The slow activate thermal batteries (750 to 1,000 milliseconds) which last 40 to 60 seconds do not have the required voltage and current rise characteristic needed to supply power to a warhead section. Where such batteries are normally paralleled with each other, the fast activate battery after expending its energy will cause its internal resistance to act as a load to the other power source causing the long-life battery to dissipate its power into the depleted fast-activate battery rather than into the external load, as is desired.

Prior art teaches that a diode may be satisfactorily used to isolate such parallel battery cells where no extreme environmental conditions are encountered. However, in missile applications, where the battery is required to provide a reliable source of power in the presence of both high nuclear and thermal radiations, the use of a diode as an isolator is unacceptable. It is known in the art that diode materials in the presence of high nuclear and/or thermal radiations are subject to material breakdown.

SUMMARY OF THE INVENTION

This invention utilizes an increasing impedance in the fast-activate starter section and a decrease in impedance in the power section to provide a means for obtaining the fast rise characteristic of the starter battery and the long life of the power battery. The delay squib, which is hardened to nuclear and thermal environments, alternatively controls current flow first from the starter battery and second from the power battery. Firing of the delay squib causes the normally closed switch to open; the fast activate battery is removed from the circuit so that its residual internal impedance does not act as a loss to dissipate the power section.

The primary objective of the invention is to provide an improved circuit for reliably isolating the cells of a parallel combination of fast and slow activate thermal batteries subject to high nuclear and thermal radiations.

Another object is to provide an improved circuit for reliably combining the fast rise time of a fast activate thermal battery with the long life characteristic of the slow activate thermal battery.

A further object is to provide an electrical circuit for isolating parallel fast and slow activate thermal batteries by raising the impedance of the fast activate battery so that its internal impedance, after a fixed delay period, will not dissipate the energy of the slow activate thermal power battery.

A still further object is to provide an improved circuit for supplying energy to a warhead section by isolating the cell stacks of fast and slow activate thermal batteries by using a delay fuze switch, which switch is hardened to both thermal and nuclear radiations; to reliably increase the effective impedance of the fast activate battery after a given interval of time in order to prevent dissipation of the slow activate battery's energy into the fast activate battery rather than into the external load.

The invention will be better understood when reference is made to the following description and the accompanying drawing in which a diagram of a circuit embodying the invention is shown in a preferred form.

DESCRIPTION OF THE PREFERRED EMBODIMENT

Referring now to the drawing a slow activate thermal power battery 10 has its negative terminal electrically connected to junction point 11 and its positive terminal electrically coupled to common junction point 13. A conductor 12 electrically connects the negative output terminal 14 to the junction point 11. A conductor 16 electrically couples the positive output terminal 18 to the junction point 13. A load 32 is electrically connected to the output terminals 14 and 18 by conductors 35 and 36 respectively. A fast activate thermal starter battery 20 is electrically paralleled across the slow activate power battery 10 by having its negative terminal electrically connected to a common junction point 15 and the latter to common junction point 11 through the electrical conductor 28; and by having its positive terminal 17 electrically connected to the positive terminal of the slow activate power battery at common junction point 13 through and in series with the normally closed delay squib switch terminals 19 and 23. The electric squib 21 has its delay squib switch terminals 19 and 23 normally closed by the pole piece 25 when power is delivered at output terminals 14 and 18. Conductor 26 electrically couples the fast activate battery positive output terminal 17 to the squib switch terminal 19. Connector 30 electrically connects squib switch terminal 23 to the positive terminal of the slow activate battery at common junction point 13 thereby completing the parallel electrical circuit between the positive terminal 17 of the fast activate battery 20 and the positive terminal of the slow activate battery 10. The electric squib 21 has a resistive squib match 22 which has a pair of terminals 24 and 27. Match terminal 24 is electrically coupled to the positive terminal 17 of the fast activate starter battery 20 by an electrical conductor 31 at the common junction 34. The other match terminal 27 is electrically connected to the negative terminal of the fast activate battery at the common junction 15 by the electrical conductor 29. An explosive delay charge 33 is proximately positioned intermediate to the squib match 22 and the pole piece 25 of the squib switch 21.

In operation, when an external force (not shown) causes the parallel cell stacks of the thermal power battery 10 and the thermal starter battery 20 to become energized, voltage will begin to rise in both the starter battery 20 and in the power battery 10. Since the starter battery voltage rises faster than the voltage generated by the power battery 10, the initial short time power needs of the load 32 will be satisfied from the starter battery 20. After approximately 15 milliseconds the voltage generated by the starter battery 20 will be sufficiently high to raise the squib match 22 temperature to the point where it will activate the explosive charge 33 which has an internal delay therein of approximately 2–5 seconds. The explosive charge 33, because of its proximate position to the squib switch pole piece 25, will cause the latter to open its electrical connection between switch terminals 19 and 23 thereby removing the starter battery from its parallel connection across the power battery and permitting the load to receive its power requirement exclusively from the now fully activated power battery 10 which has during the aforementioned interval of time come up to its full operating voltage.

I have accordingly described an electrical circuit for isolation of cell stacks in thermal batteries in the above preferred embodiment which permits the fast rise time of the fast activate starter battery to combined with the long life characteristic of the slow activate battery so that it can reliably function in high nuclear and thermal radiations.

I wish it to be understood that I do not desire to be limited to the exact detail of construction shown and described for obvious modification will occur to a person skilled in the art.

What is claimed is:

1. An electrical circuit for isolating cell stacks of thermal batteries supplying energy to an external load, which comprises:
    a thermal starter battery of the fast activate type;
    a thermal power battery of the slow activate type electrically coupled in parallel with said starter battery; and
    means for electrically isolating said starter battery from said external load and said power battery a short interval of time after initiation of said starter and power batteries thereby preventing said starter battery low internal impedance form dissipating energy from said power battery and supplying said external load with a source of power which has the rapid voltage and current rise time characteristics of said starter battery and the long life characteristics of said power battery.

2. A cell stack isolation circuit as recited in claim 1 wherein said isolating means comprises:
    a delay squib switch having normally closed contacts for electrically connecting said starter battery in parallel with said power battery;
    a delay squib match electrically connected in parallel with said starter battery; and
    an explosive charge operatively positioned intermediate said squib match and said squib switch, said match activating said charge which explosively opens said squib switch.

* * * * *